(12) United States Patent
Reese et al.

(10) Patent No.: US 8,801,201 B2
(45) Date of Patent: Aug. 12, 2014

(54) DUAL SIDED MIRROR BOOK IMAGING DEVICES AND METHODS

(75) Inventors: Jack Reese, Lincoln, UT (US); Shawn Reid, Orem, UT (US)

(73) Assignee: Ancestry.com Operations Inc., Provo, UT (US)

( * ) Notice: Subject to any disclaimer, the term of this patent is extended or adjusted under 35 U.S.C. 154(b) by 547 days.

(21) Appl. No.: 13/022,813

(22) Filed: Feb. 8, 2011

(65) Prior Publication Data

US 2012/0200948 A1    Aug. 9, 2012

(51) Int. Cl.
| | | |
|---|---|---|
| *G02B 5/08* | (2006.01) | |
| *G02B 7/182* | (2006.01) | |
| *G03B 27/62* | (2006.01) | |
| *G03G 15/04* | (2006.01) | |
| *G03G 15/00* | (2006.01) | |

(52) U.S. Cl.
CPC *G02B 5/08* (2013.01); *G02B 7/182* (2013.01); *G03B 27/62* (2013.01); *G03G 15/605* (2013.01); *Y10S 359/90* (2013.01)
USPC .............. 359/840; 359/872; 359/900; 355/25; 355/75; 355/77; 399/362; 399/377

(58) Field of Classification Search
CPC .......... G02B 5/08; G02B 7/182; G03B 27/62; G03G 15/605
USPC ............ 359/726, 817, 840, 872, 900; 355/25, 355/75, 77; 399/362, 377; 348/207.99
See application file for complete search history.

(56) References Cited

U.S. PATENT DOCUMENTS

| | | | | |
|---|---|---|---|---|
| 1,346,017 | A  * | 7/1920 | Goodman | 446/147 |
| 5,359,207 | A  * | 10/1994 | Turner | 257/81 |
| 5,636,006 | A  * | 6/1997 | Wu | 355/75 |
| 5,847,846 | A  * | 12/1998 | Wu et al. | 358/475 |
| 6,862,074 | B2 * | 3/2005 | Tretiakoff et al. | 355/25 |
| 7,605,844 | B1 * | 10/2009 | Page et al. | 348/207.99 |

FOREIGN PATENT DOCUMENTS

| | | | |
|---|---|---|---|
| DE | 3546404 | * | 7/1987 |
| GB | 2131969 | * | 6/1984 |
| JP | 59089072 | * | 5/1984 |

* cited by examiner

*Primary Examiner* — Ricky D Shafer

(74) *Attorney, Agent, or Firm* — Kilpatrick Townsend & Stockton LLP

(57) ABSTRACT

Devices, systems, and methods for facilitating the imaging of books are presented. A first transparent plate and a second transparent plate may be positioned at approximately a 45 degree angle to the first transparent plate. A dual-sided mirror may be configured to be positioned substantially parallel with the first transparent plate and to be positioned substantially parallel with the second transparent plate. The first side of the dual-sided mirror may be configured to reflect a first image of a first page of a book, the first image being received by the dual-sided mirror through the first transparent plate. The second side of the dual-sided mirror may be configured to reflect a second image of a second page of the book, the second image being received by the dual-sided mirror through the second transparent plate.

16 Claims, 7 Drawing Sheets

DUAL SIDED MIRROR BOOK IMAGING DEVICES AND METHODS

BACKGROUND OF THE INVENTION

For centuries, books have been used to store information. While books have proven reliable for storing information, such as text and pictures, for long periods of time, having the information available in an electronic format may be more useful for certain applications. Since information contained in some books may not be readily available from an electronic source, these books may need to be physically accessed in order to retrieve the information they possess. However, accessing these books, through opening them and turning the pages, may damage the books. Damage to books through actions such as opening the books, closing the books, and turning pages of the books, may be especially pronounced for old books and books with a large number of pages (e.g., books with a thick binding).

FIG. 1 illustrates a book 100 opened on a horizontal surface 120. When book 100 is opened on horizontal surface 120, a front cover 130 and a back cover 140 of book 100 may rest on horizontal surface 120. Opening book 100 such that front cover 130 and back cover 140 rest on horizontal surface 120 may be referred to as opening book 100 to 180°. Having book 100 in such a position may place a significant amount of stress on bookbinding 150 (also referred to as the book's binding). If book 100 is old and/or contains a large number of pages, the stress placed on bookbinding 150 by opening book 100 to 180° may be sufficient to permanently damage book 100.

Besides potentially damaging the book, opening the book to 180° may be prohibited by the book's owner. For example, some archives and libraries may not permit rare, old, fragile, and/or special collection books to be opened to such a position due to the risk of damage to the bookbinding. However, if a book is not opened to a wide angle, such as 180°, it may be difficult to view all of the information contained on each page. For example, text and/or pictures printed close to the book's gutter 160, that is, the space between the printed area of each page and where the pages are attached with bookbinding 150, may be difficult to view if the book is only opened to a small angle, such as 90° or 45°.

BRIEF SUMMARY OF THE INVENTION

In some embodiments, a device for facilitating the imaging of books is presented. The device may include a first transparent plate. The device may also include a second transparent plate positioned at approximately a 45 degree angle to the first transparent plate. Further, the device may include a dual-sided mirror configured to be positioned substantially parallel with the first transparent plate and to be positioned substantially parallel with the second transparent plate. A first side of the dual-sided mirror may be configured to reflect a first image of a first page of a book, the first image being received by the dual-sided mirror through the first transparent plate. A second side of the dual-sided mirror may be configured to reflect a second image of a second page of the book, the second image being received by the dual-sided mirror through the second transparent plate.

In some embodiments, the first side of dual-sided mirror is further configured to reflect the first image of the first page of the book to a first imaging device; and the second side of the dual-sided mirror is further configured to reflect the second image of the second page of the book to a second imaging device. Also, in some embodiments a hinge is located substantially at the origin of the substantially 45 degree angle formed by the first transparent plate and the second transparent plate; and the hinge is configured to allow the dual-sided mirror to pivot between being substantially parallel with the first transparent plate and being substantially parallel with the second transparent plate. The device may also include a first lateral support configured to couple the first transparent plate with the second transparent plate at the substantially 45 degree angle; and a second lateral support configured to couple the first transparent plate with the second transparent plate at the substantially 45 degree angle. The first portion of the first transparent plate and a second portion of the second transparent plate may be positioned at the substantially 45 degree angle from the first portion of the first transparent plate, and may be configured to be inserted between the first page of the book and the second page of the book to increase a distance between the first page of the book and the second page of the book. Also, the first transparent plate and the second transparent plate may be configured to decrease a first curvature of the first page and decrease a second curvature of the second page when the first transparent plate and the second transparent plate are inserted between the first page of the book and the second page of the book.

In some embodiments, a method for imaging pages of a book is presented. The method may include opening the book such that a first page and a second page to be imaged are exposed. The method may also include inserting, between the first page of the book and the second page of the book, a device for facilitating the imaging of books, wherein the device for facilitating the imaging of books may comprise: a first transparent plate; a second transparent plate positioned at an angle to the first transparent plate; and a dual-sided mirror configured to be positioned substantially parallel with the first transparent plate and to be positioned substantially parallel with the second transparent plate. The method may include positioning the dual-sided mirror of the device for facilitating the imaging of books at least substantially parallel with the second transparent plate. The method may include imaging the first page of the book, wherein the image is transmitted from the first page, through the first transparent plate, and reflected by the dual-sided mirror to the first imaging device. The method may also include positioning the dual-sided mirror of the device for facilitating the image of the books at least substantially parallel with the first transparent plate. Further, the method may include imaging the second page of the book, wherein the image is transmitted from the second page, through the second transparent plate, and reflected by the dual-sided mirror to the second imaging device.

In some embodiments, an apparatus for facilitating the imaging of books is presented. The apparatus may include a first means, wherein the first means is at least substantially transparent. The apparatus may include a second means coupled approximately at a 45 degree angle with the first means, wherein the second means is at least substantially transparent. The apparatus may include a third means configured to be positioned substantially parallel with the first means and to be positioned substantially parallel with the second means. The third means may have at least two reflective sides. A first side of the third means may be configured to reflect a first image of a first page of a book, the first image being received by the third means through the first means. A second side of the third means may be configured to reflect a second image of a second page of the book, the second image being received by the third means through the second means.

BRIEF DESCRIPTION OF THE DRAWINGS

A further understanding of the nature and advantages of the present invention may be realized by reference to the following drawings. In the appended figures, similar components or features may have the same reference label.

DETAILED DESCRIPTION OF THE INVENTION

Figure 1:
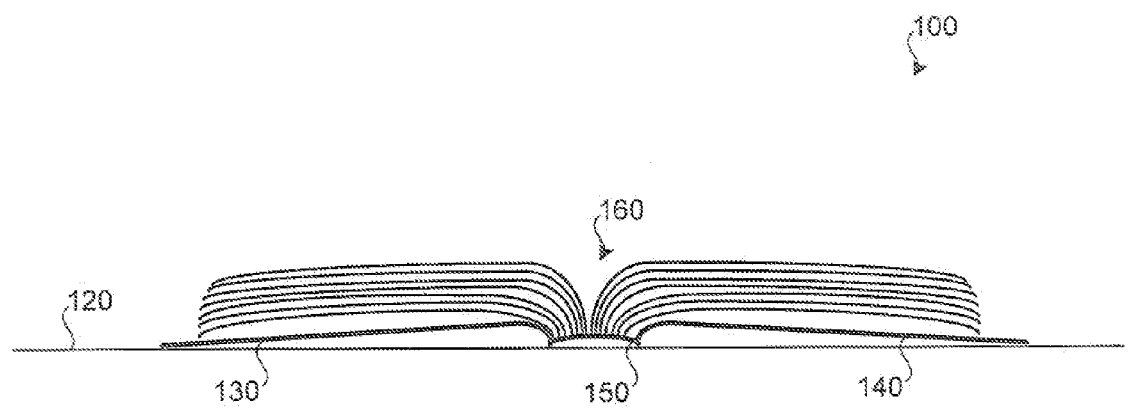
FIG. 1 illustrates an embodiment of a book open to 180°.

In order to prevent a book from being damaged when opened, rather than opening the book to a wide angle, such as 180°, it may be opened to a smaller angle, such as 90° or 45°. The smaller the angle the book is opened to, the less likely any damage may occur to the book or the bookbinding.

While opening a book to an angle less than 180° may decrease the likelihood that the book will be damaged, it may also make it difficult or impossible to view all of the information printed on the pages. For example, to view information printed in a book near the book's gutter, the book may need to be opened wide.

To facilitate the viewing of information printed on pages of a book while the book is open to an angle smaller than 180°, a book imaging device may be used. Such a book imaging device may include two transparent plates, possibly made of glass or transparent plastic, offset from each other at approximately a 45° angle. Between these transparent plates, a dual sided mirror may be present. This dual sided mirror may be pivoted such that it is approximately parallel to each of the transparent plates. When the book imaging device is inserted between two pages of a book, the book imaging device may facilitate the viewing of information printed on those pages of the book.

The book imaging device may be inserted between two pages that are desired to be viewed. Inserting the book imaging device may create (or increase) a space between the two pages. This space may facilitate the viewing of information printed on pages of the book near the book's gutter. Further, the book imaging device may force some or all of the pages of the book into a position approximately parallel with either the first transparent plate or the second transparent plate, thereby reducing the curvature of the pages. Reducing the curvature of the pages being viewed may facilitate the imaging of these pages.

After the book viewing device has been inserted between two pages in the book and the left page is desired to be viewed, the dual sided mirror may be positioned parallel with the transparent plate on the right of the book imaging device. An image of the first page may be transmitted through the first transparent plate, reflected by the dual sided mirror, and viewed by a person or imaged by an imaging device. Distortion of the first page may be minimized by the book viewing device having a 45° angle between the first transparent plate and the second transparent plate. This 45° angle may result in the image reflected by the dual mirror having little, if any, distortion when received by the imaging device or viewed by the person.

To view the right page, the dual sided mirror may be positioned parallel to the transparent plate on the left of the book imaging device. An image of the second page may be transmitted through the second transparent plate, reflected by the dual sided mirror, and either viewed by the person or imaged by the same imaging device or a different imaging device. Following these two pages being viewed or imaged, the book imaging device may be removed, the page of the book may be turned, and then the book imaging device may be reinserted to repeat the process for additional pages of the book.

Figure 2:
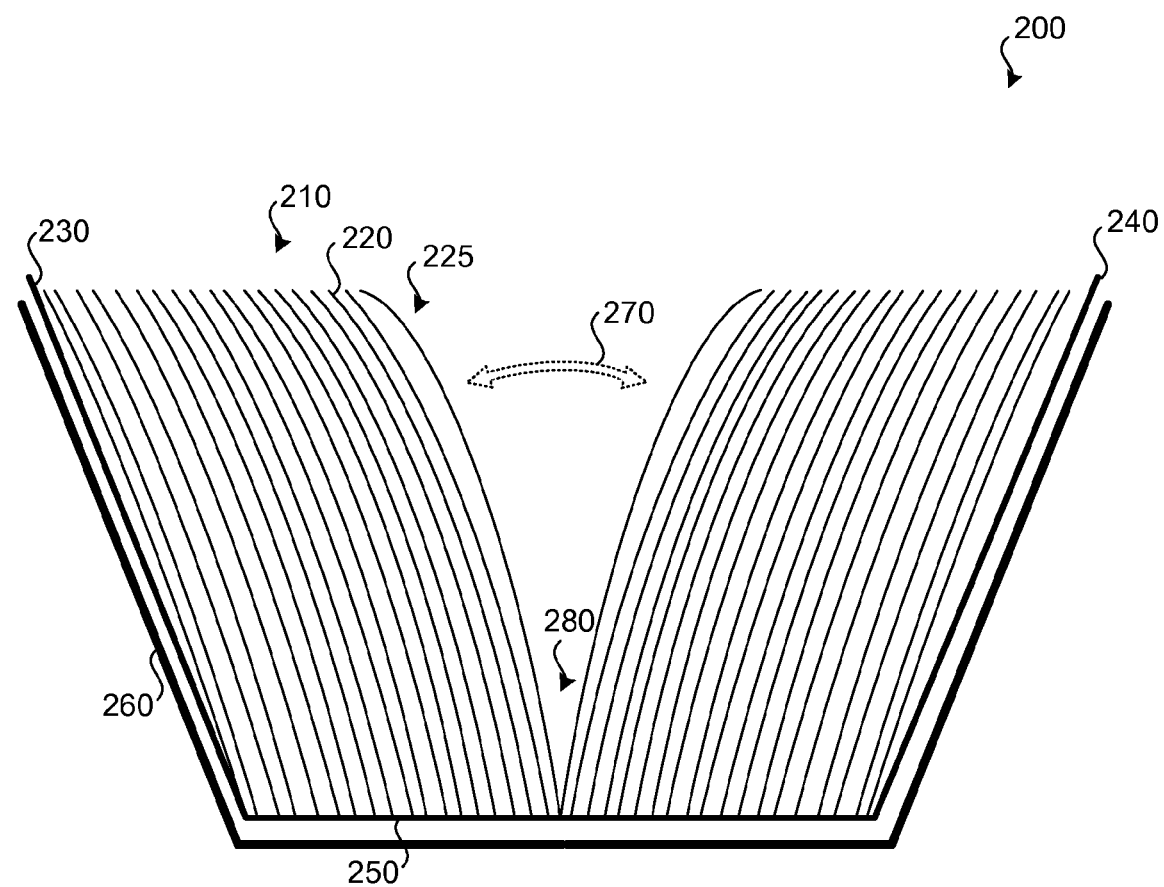
FIG. 2 illustrates an embodiment of a book held open at a 45° angle.

FIG. 2 illustrates an embodiment 200 of a book held open at a 45° angle. Book 210 contains a number of pages 220. Book 210 also has a front cover 230, a back cover 240, and a bookbinding 250. Book 210 is supported by a reprographic copy stand 260. Reprographic copy stand 260 is configured to hold book 210 open at a 45° angle, as illustrated by dotted arrow 270. It should be understood that the same or a different reprographic copy stands may be used to support book 210 at other angles.

While book 210 is open, pages 220 may not remain planar. Rather, a curvature, such as curvature 225 of page open on the left of book 210, may be present. Such curvature may make it difficult to accurately capture an image of the curved pages. For example, a two-dimensional image taken of the page open on the left of book 210 may result in the information printed on the page appearing skewed in the image due to curvature 225. Further, curvature 225 may result in a captured image of the page being blurred due to portions of the page being closer or further away from the imaging device than other portions of the page.

Also, while book 210 is being supported by reprographic copy stand 260, it may be difficult or impossible to view information printed near the gutter 280 of book 210. In order to facilitate the viewing of information printed on pages near gutter 280, along with information printed on the remainder of pages 220, a book imaging device may be used.

Figure 3:
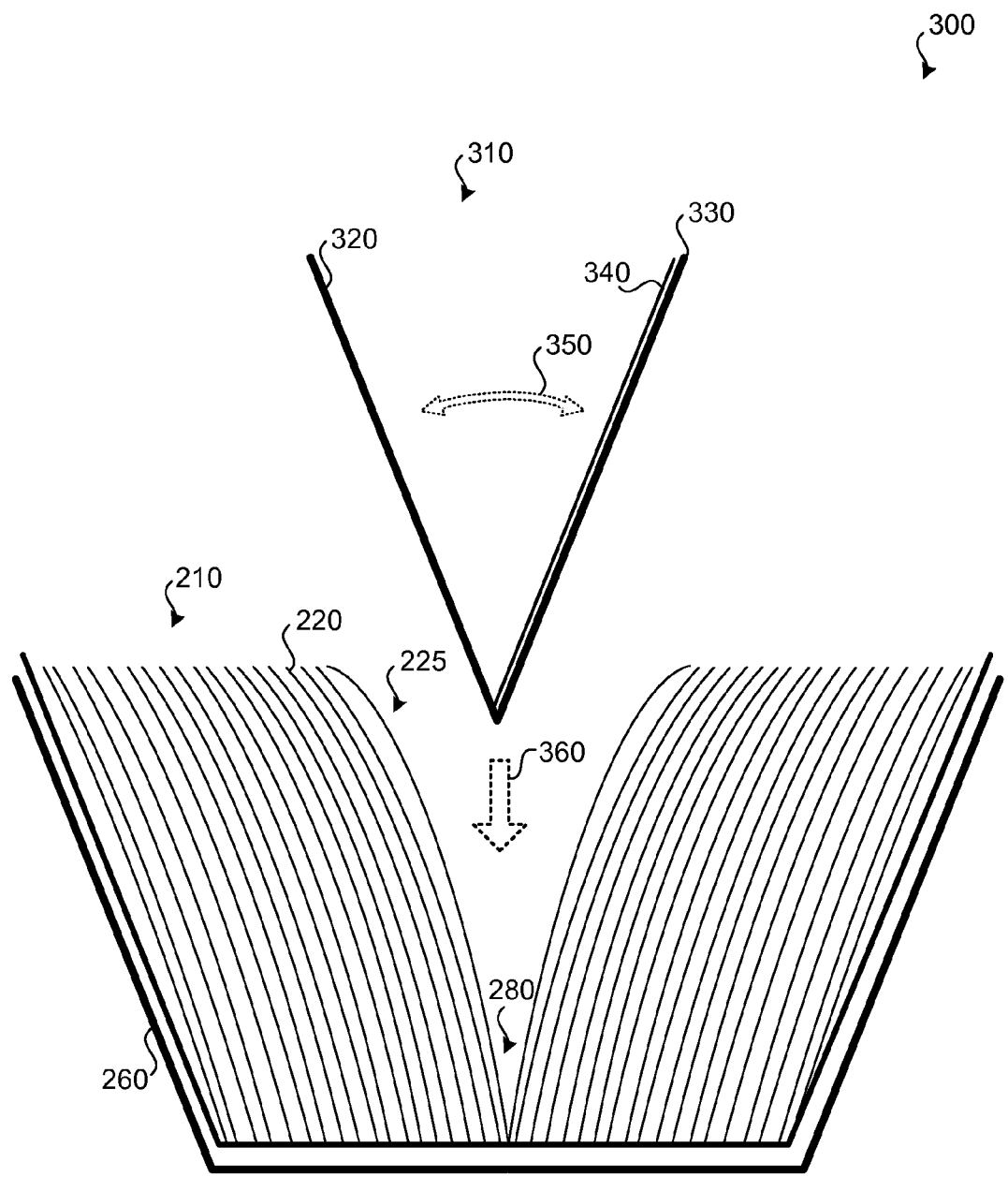
FIG. 3 illustrates an embodiment of a book held open at a 45° angle with a book imaging device.

FIG. 3 illustrates an embodiment 300 of a book held open at a 45° angle with a book imaging device about to be inserted. Book 210 of FIG. 3 may represent book 210 of FIG. 2. Similarly, reprographic copy stand 260 of FIG. 3 may represent reprographic copy stand 260 of FIG. 2. Book imaging device 310 may include several parts: a first transparent plate 320, a second transparent plate 330, and a dual sided mirror 340.

First transparent plate 320 may be a flat panel of a transparent or semi-transparent material, such as glass or plastic. Similarly, second transparent plate 330 may also be a flat-panel of a transparent, or semi-transparent material, such as glass or plastic. First transparent plate 320 and second transparent plate 330 may be connected at, roughly, a 45° angle, as represented by dotted arrow 350.

Between transparent plates 320 and 330, a dual sided mirror may be present. The dual sided mirror 340 may be reflective on both sides. Dual sided mirror 340 may be made out of glass, plastic, or some other reflective or semi-reflective material. Dual sided mirror 340 may be pivoted between being parallel, or roughly parallel, with first transparent plate 320 and second transparent plate 330. Dual sided mirror 340 may, or may not, be attached with first transparent plate 320 and second transparent plate 330. It may be possible to lift and remove dual sided mirror 340 from between first transparent panel 320 and second transparent panel 330. If dual sided mirror 340 is not attached with first transparent panel 320 or second transparent panel 330, dual sided mirror 340 may be held in place, at least in part, by gravity. In some embodiments, dual sided mirror 340 is attached with first transparent panel 320 and second transparent panel 330 by a hinge. This hinge may be located at or near where first transparent panel 320 and second transparent panel 330 meet.

As book imaging device 310 is inserted into book 210, represented by dotted arrow 360, a space, or distance, between the pages that are open may be created or increased near gutter 280. This increase in space or distance may make it easier (or possible) to view information printed on the open pages near gutter 280. Also, inserting book imaging device 310 may provide support to pages 220 and either reduce or eliminate curvature 225 present in pages 220.

Figure 4:
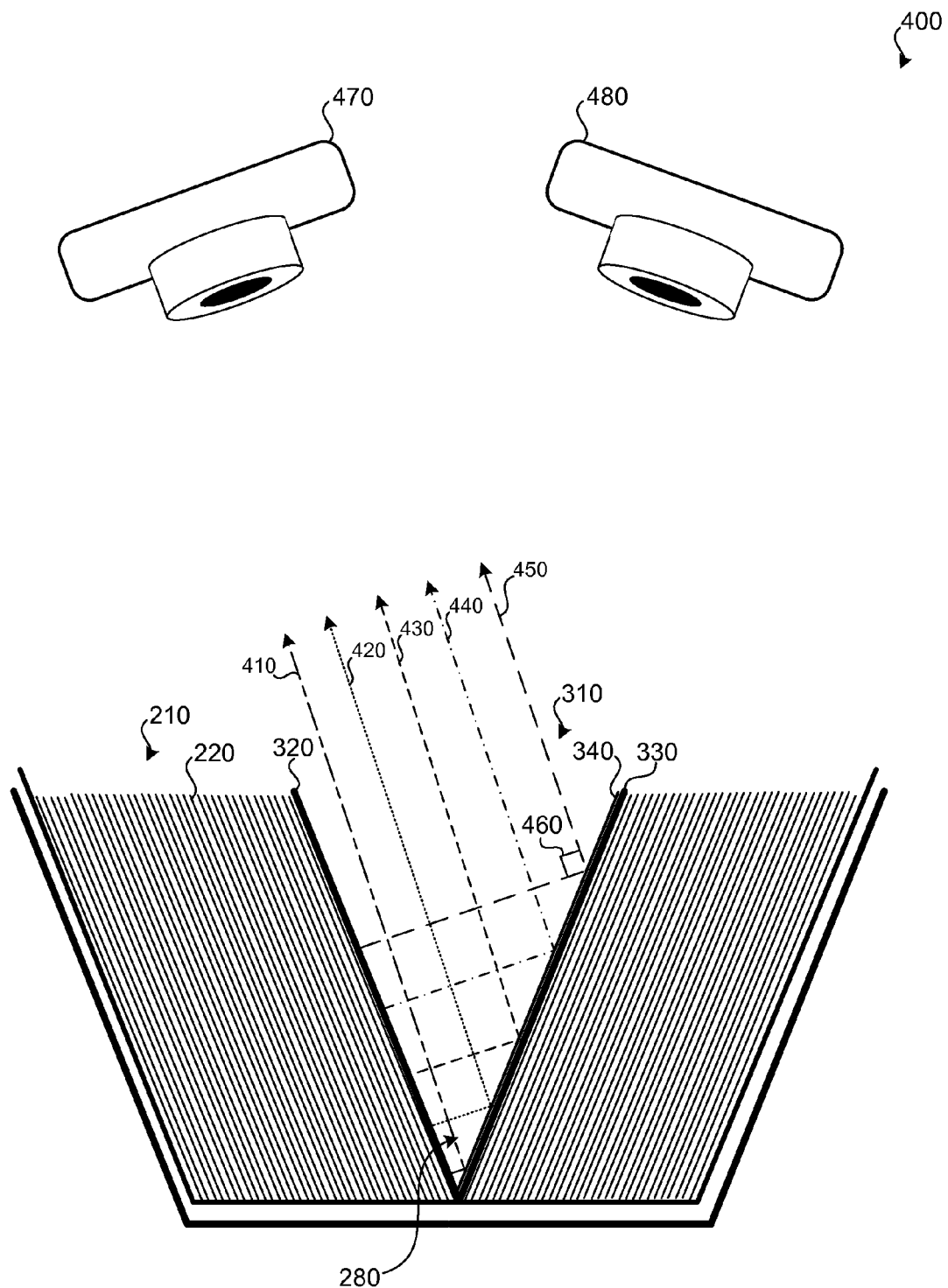
FIG. 4 illustrates an embodiment of a book held open at a 45° angle with a book imaging device inserted in the book.

FIG. 4 illustrates an embodiment 400 of a book held open at a 45° angle with a book imaging device inserted between pages in the book. Book imaging device 310 of FIG. 4 may represent book imaging device 310 of FIG. 3. Similarly book 210 of FIG. 4 may represent book 210 of FIGS. 2 and 3. In FIG. 4, book imaging device 310 has been inserted between two pages of book 210, such that the portion of book imaging device 310 where the first and second transparent panels meet is touching, or near, the binding of book 210. To be clear, book imaging device 310 may be referred to as having been inserted between a first page and a second page of book 210. References to "a first page" and "a second page" do not refer to the page numbers; rather, these references refer to two different pages of the book.

Image capture devices 470 and 480 may be present to capture images of the pages of book 210. Image capture devices 470 and 480 may be cameras, video cameras, or some other devices capable of capturing images of open pages of book 210. In some embodiments, one image capture device may be used. If one image capture device is used, it may be necessary to reposition the image capturing device depending on whether a page on the left or right side of the book is being imaged. In some embodiments, as illustrated in FIG. 4, two image capture devices may be used. If two image capture devices are used, such as image capture devices 470 and 480, one image capture device may be positioned to capture images of the page on the left of the book and one image capture device may be positioned to capture images of pages on the right of the book. In FIG. 4, image capture device 470 is positioned to capture images of pages on the right side of the book and image capture device 480 is positioned to capture images of pages on the left side of the book. Image capture devices 470 and 480, or a system connected with image capture devices 470 and 480, such as a computer system, may be configured to invert images received using book imaging device 310. This may be necessary because dual sided mirror 340 may invert the images, therefore, the images may need to be again inverted for the information printed on pages 210 to appear as printed.

Light rays 410-450, which are represented by dotted lines, illustrate an image of a first page of book 210 being transmitted through first transparent plate 320 and reflected by dual sided mirror 340. Light rays 410-450 may then be received by image capture device 470. If book imaging device has a 45 degree angle between first transparent plate 320 and second transparent plate 330, light rays 410-450 may be reflected at a 90° angle, such as represented by right angle indicator 460. In FIG. 4, dual sided mirror 340 is resting against second transparent plate 330. Accordingly, dual sided mirror 340 and second transparent plate are parallel, or substantially parallel, with each other.

As illustrated in FIG. 4, inserting book imaging device 310 may reduce the curvature in pages 210. This reduction in curvature may allow for a sharper image, with less distortion, to be captured by image capture devices 470 and 480. If text present on the pages is to be converted to machine encoded text, having a sharper image and a decreased amount of distortion may increase the likelihood that the conversion to machine encoded text accurately represents the text as printed on the pages.

Also, inserting book imaging device 310 into a book may increase a space between the pages being imaged. This increased space, or distance, between the pages that are open may be created or increased near gutter 280. This increase in space or distance may make it easier or possible to view information printed on the open pages near gutter 280.

Figure 5:
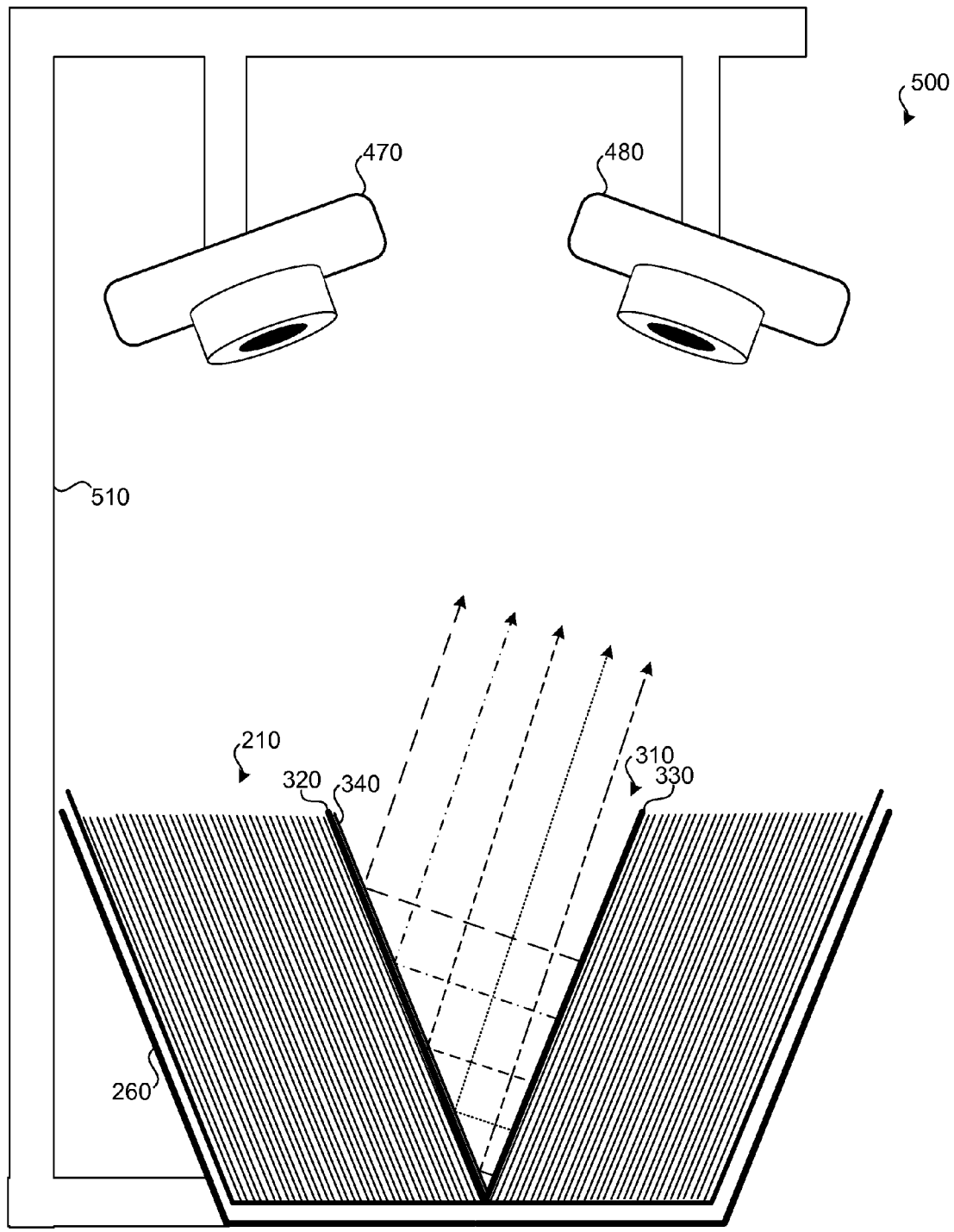
FIG. 5 illustrates another embodiment of a book held open at a 45° angle with a book imaging device inserted in the book.

FIG. 5 illustrates another embodiment 500 of a book held open at a 45° angle with a book imaging device inserted in the book. FIG. 5 may represent book 210 of FIG. 4 with book imaging device 310 inserted between the same two pages, but with dual sided mirror 340 placed against, and roughly parallel with, first transparent plate 320. A person may be required to move dual sided mirror 340 from being parallel with second transparent plate 330 to being parallel, or roughly parallel, with first transparent plate 320. This may involve placing a finger atop dual transparent plate 340 and moving it. In some embodiments, a lever or protrusion is attached with dual sided mirror 340 to facilitate a person moving dual sided mirror 340. An image of the second open page, that is, the page on the right of FIG. 5, may be transmitted through transparent plate 330 and reflected by dual-sided mirror 340. The image may be received by image capture device 480. The image may be reflected by dual sided mirror 340 at a 90° angle from the second page to image capture device 480.

A support structure 510 may be present. Support structure 510 may support image capture devices 470 and 480. Support structure 510 may also be coupled with reprographic copy stand 260. Support structure 510 may be made out of any appropriate material, such as plastic, wood, or metal. Having reprographic copy stand 260 coupled with the same support structure as image capture devices 470 and 480 may decrease or eliminate the amount of adjustments necessary in the position of image capture devices 470 and 480 (or reprographic copy stand 260 and book 210) to achieve proper alignment for images taken of pages of book 210.

Figure 6:
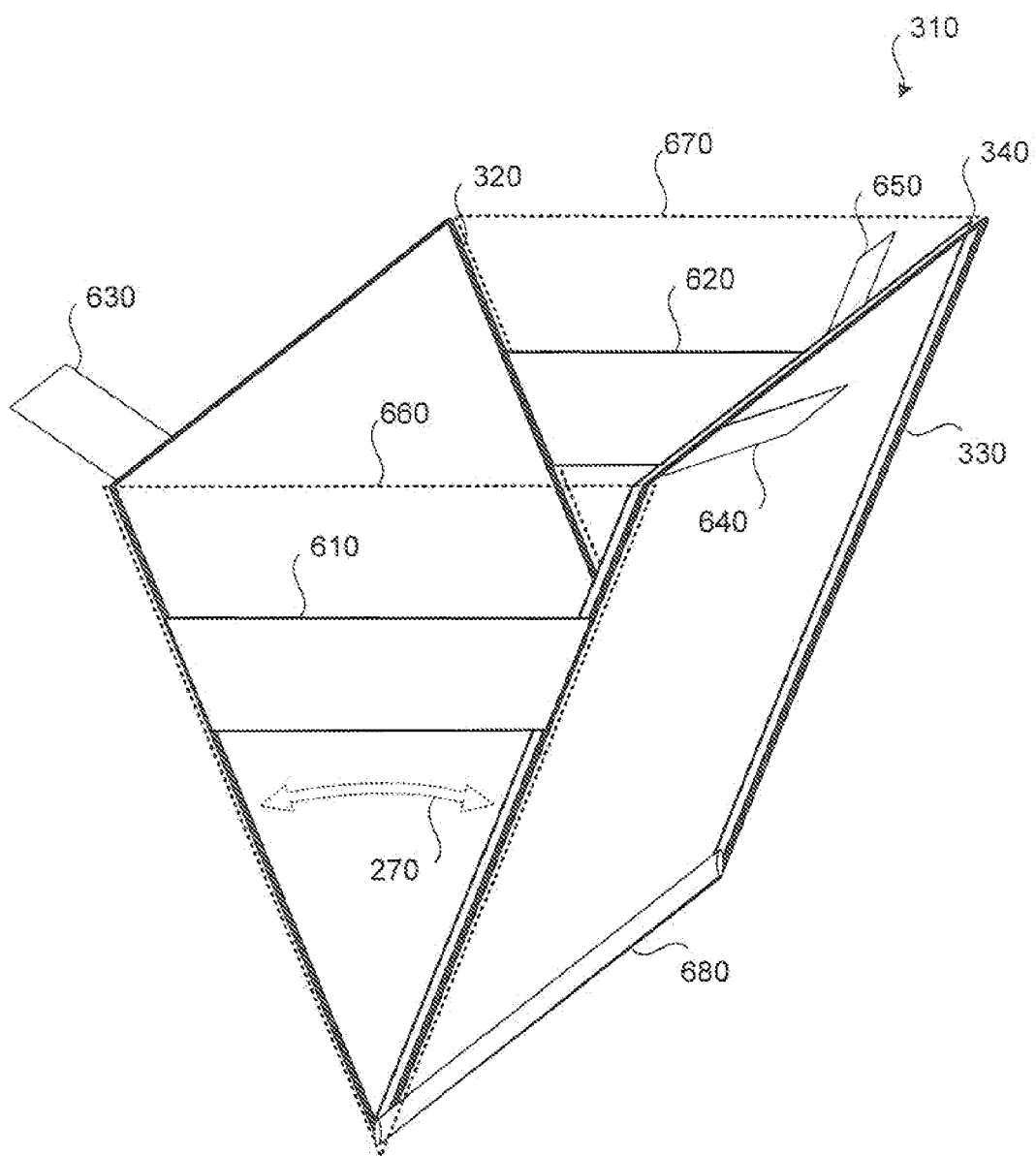
FIG. 6 illustrates an embodiment of a book imaging device.

FIG. 6 illustrates an embodiment 600 of a book imaging device from an angle. Book imaging device 310 may represent book imaging device 310 of FIGS. 3-5. A first lateral support 610 and a second lateral support 620 may hold first transparent plate 320 at an 45° angle (as represented by dotted arrow 270) to second transparent plate 330. First and second lateral supports 610 and 620 may be a strip of rigid or semi-rigid material that is rigid enough to hold first transparent plate 320 and second transparent plate 330 at the 45 degree angle. First lateral support 610 and second lateral support 620 may alternatively be in a "V" shape (as defined by dotted lines 660 and 670) and connect first transparent plate 320 and second transparent plate 330.

Tabs 630 and 640 may be present to help a user insert and/or remove book imaging device 310 from a book. Further, tabs 630 and 640 may help a user in not getting marks, such as fingerprints, on first transparent plate 320 and second transparent plate 330 by reducing the likelihood that a user would need to directly touch these components. Tab 650 may be attached with dual sided mirror 340. Tab 650 may be present to help a user position dual sided mirror 340 from being parallel with first transparent plate 320 to being parallel with second transparent plate 330, and from being parallel with second transparent plate 330 to being parallel with first transparent plate 320. Similar to tabs 630 and 640, tab 640 may help a user in not getting marks, such as fingerprints, on first transparent plate 320, second transparent plate 330, or dual sided mirror 340 by reducing the likelihood that a user would need to directly touch these components of book imaging device 310.

Hinge 680 may couple dual sided mirror 340 with first transparent plate 320 and second transparent plate 330. Hinge 680 allows dual sided mirror 340 to pivot between being parallel, or roughly parallel, with first transparent plate 320 and second transparent plate 330. Hinge 680 may be designed to be thin, such that when book imaging device 310 is placed between pages in a book, hinge 680 does not substantially interfere with book imaging device 310 being inserted to touching, or almost touching, the book's binding, as illustrated in FIG. 5. In some embodiments, hinge 680 may not be present, and dual sided mirror 340 may be held in place between first transparent plate 320 and second transparent plate 330 by gravity and/or friction.

Figure 7:
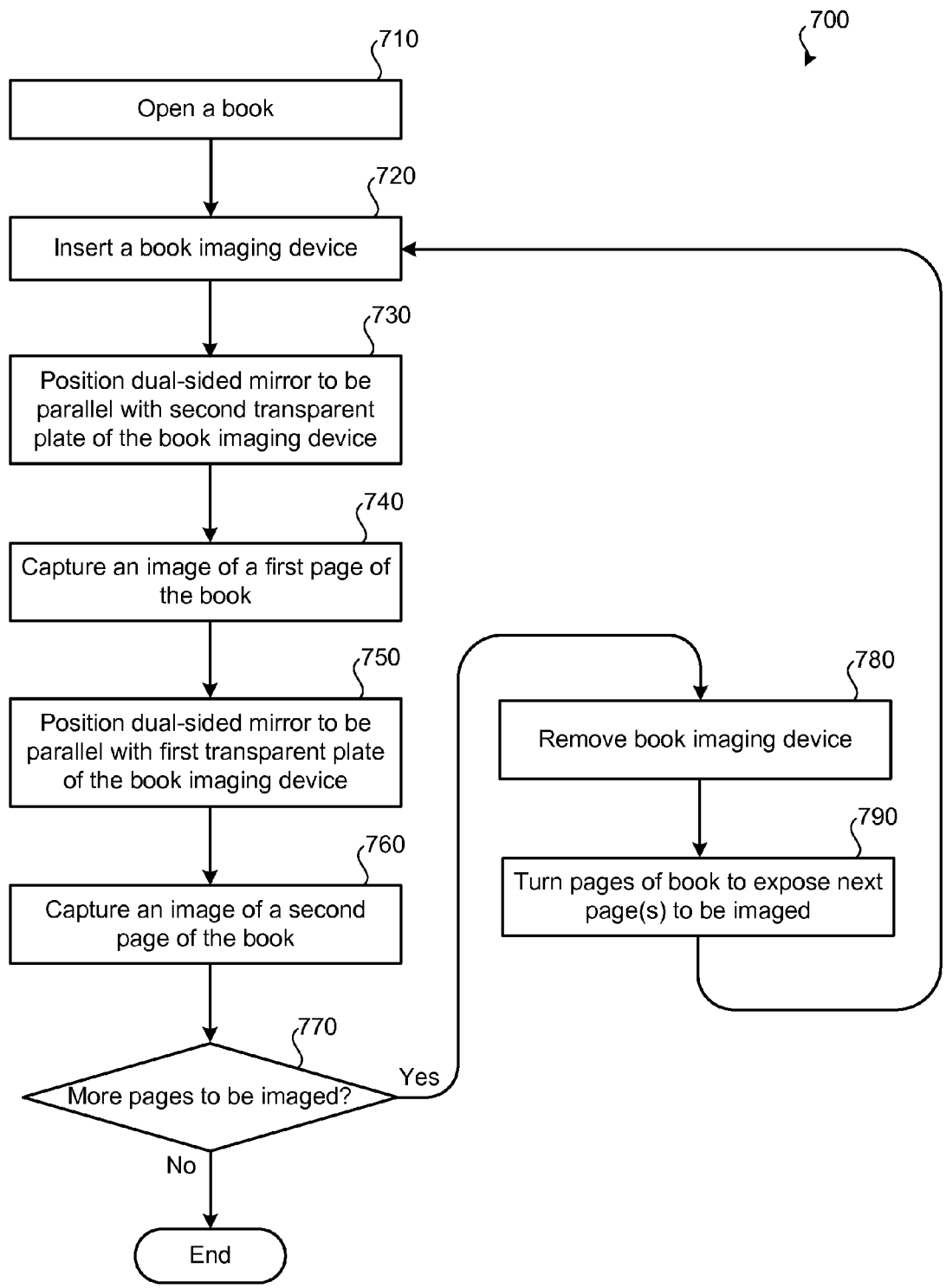
FIG. 7 illustrates an embodiment of a method for capturing images of pages of a book using a book imaging device.

Book imaging device 310, as described in FIGS. 2-6, may be used in accordance with a method, such as method 700 in FIG. 7. Method 700 is an embodiment of a method for capturing images of pages of a book facilitated by a book imaging device. At block 710 a book, of which pages are to be imaged, may be opened. The open book may be placed on a reprographic copy stand, such as reprographic copy stand 260 of FIG. 2. The reprographic copy stand may keep the book open to an angle, such as 45°, in order to decrease or eliminate potential damage being caused to the book from opening it and manipulating the pages.

At block 720, a book imaging device, such as book imaging device 310, of FIGS. 3-6, may be inserted between two pages of the book that are desired to be imaged. If both pages are not desired to be imaged, the book imaging device may be inserted next to the one page that is desired to be imaged. The book imaging device may be pressed firmly into place such that the lowest portion of the first transparent plate and the second transparent plate of the book imaging device is resting against or near the inside of the book's binding. Inserting the book imaging device between the two pages may create or increase the distance or space between the two pages near the book's gutter. This increase in space may facilitate an image being captured of each page of the book that includes all of the text present on each page. Further, inserting the book imaging device may provide support to the pages of the book such that curvature present in the pages being imaged is reduced or eliminated.

At block 730, the dual sided mirror of the book imaging device may be positioned to be parallel, or approximately parallel, with the second transparent plate of the book imaging device. This position may allow for a page on the left side of the book to be imaged. Using an image capture device, such as a camera, an image of the page on the left side of the book may be captured at block 740.

At block 750, the dual sided mirror may be positioned to be parallel, or roughly parallel, with the first transparent plate of the book imaging device. This position may allow for a page on the right side of the book to be imaged. Again, using an image capture device, such as a camera, an image of the page on the right side of the book may be captured at block 760. The image capture device used at block 740 may or may not be the same image capture device used at block 760. If the same image capture device is used for both pages, the image capture device may need to be repositioned in order to capture both images. Alternatively, if two image capture devices are used, one image capture device may be positioned to capture images of pages on the right side of the book, while the other image capture device may be positioned to capture images of pages on the left side of the book. For example, the image capture devices may be positioned as image capture device 470 and image capture device 480 are positioned in FIG. 4.

At block 770, if no more pages are to be imaged, the method may end. However, if more pages of the book are to be imaged, the method may continue to block 780. At block 780, a user may remove the book imaging device from the book. At block 790, pages of the book may be turned to expose the next page or pages, of the book to be imaged. Once the next page or pages to be imaged are exposed, the method may return to block 720. Method 700 may continue until all the pages of the book that are desired to be imaged have been imaged.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Further, while the preceding description refers only to books, it should be understood that the devices, methods, and systems described herein may also be applicable to other printed materials, such as magazines, ledgers, pamphlets, and binders.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A device for facilitating imaging of books, the device comprising:

a first transparent plate;

a second transparent plate positioned at approximately a 45 degree angle to the first transparent plate; and a dual-sided mirror configured to be positioned substantially parallel with the first transparent plate and to be positioned substantially parallel with the second transparent plate, wherein:

a first side of the dual-sided mirror is configured to reflect a first image of a first page of a book, the first image being received by the dual-sided mirror through the first transparent plate; and a second side of the dual-sided mirror is configured to reflect a second image of a second page of the book, the second image being received by the dual-sided mirror through the second transparent plate;

wherein:

the first side of dual-sided mirror is further configured to reflect the first image of the first page of the book to a first imaging device; and the second side of the dual-sided mirror is further configured to reflect the second image of the second page of the book to a second imaging device.

2. The device for facilitating the imaging of books of claim 1, further comprising a hinge, wherein:

the hinge is located substantially at the origin of the substantially 45 degree angle formed by the first transparent plate and the second transparent plate; and the hinge is configured to allow the dual-sided mirror to pivot between being substantially parallel with the first transparent plate and being substantially parallel with the second transparent plate.

3. The device for facilitating the imaging of books of claim 2, further comprising:

a first lateral support configured to couple the first transparent plate with the second transparent plate at the substantially 45 degree angle; and a second lateral support configured to couple the first transparent plate with the second transparent plate at the substantially 45 degree angle.

4. The device for facilitating the imaging of books of claim 3, wherein: a first portion of the first transparent plate and a second portion of the second transparent plate positioned at the substantially 45 degree angle from the first portion of the first transparent plate, are configured to be inserted between the first page of the book and the second page of the book to increase a distance between the first page of the book and the second page of the book.

5. The device for facilitating the imaging of books of claim 1, wherein the first transparent plate and the second transparent plate are configured to decrease a first curvature of the first page and decrease a second curvature of the second page when the first transparent plate and the second transparent plate are inserted between the first page of the book and the second page of the book.

6. A method for imaging pages of a book, the method comprising:

opening the book such that a first page and a second page to be imaged are exposed;

inserting, between the first page of the book and the second page of the book, a device for facilitating imaging of books, wherein the device for facilitating imaging of books comprises:

a first transparent plate;

a second transparent plate positioned at an angle to the first transparent plate; and a dual-sided mirror configured to be positioned substantially parallel with the first transparent plate and to be positioned substantially parallel with the second transparent plate;

positioning the dual-sided mirror of the device for facilitating the imaging of books at least substantially parallel with the second transparent plate;

imaging, using a first imaging device, the first page of the book, wherein the image is transmitted from the first page, through the first transparent plate, and reflected by the dual-sided mirror to the first imaging device;

positioning the dual-sided mirror of the device for facilitating the image of the books at least substantially parallel with the first transparent plate; and imaging, using a second imaging device, the second page of the book, wherein the image is transmitted from the second page, through the second transparent plate, and reflected by the dual-sided mirror to the second imaging device.

7. The method for imaging pages of a book of claim 6, wherein the angle is substantially 45 degrees.

8. The method for imaging pages of a book of claim 6, wherein the first imaging device and the second imaging device are the same imaging device.

9. The method for imaging pages of a book of claim 6, wherein inserting, between the first page of the book and the second page of the book, the device for facilitating the imaging of books, further comprises creating a space between the first page and the second page.

10. The method for imaging pages of a book of claim 6, wherein opening the book such that the first page and the second page to be imaged are visible further comprises supporting a first cover of the book and a second cover of the book such that the book is opened at substantially a 45 degree angle.

11. The method for imaging pages of a book of claim 6, wherein:

imaging, using the first imaging device, the first page of the book, comprises imaging all information printed on the first page of the book; and imaging, using the second imaging device, the second page of the book, comprises imaging all information printed on the second page of the book.

12. The method for imaging pages of a book of claim 6, further comprising:

removing, from between the first page of the book and the second page of the book, the device for facilitating the imaging of books;

opening the book such that a third page and a fourth page to be imaged are visible;

inserting, between the third page of the book and the fourth page of the book, the device for facilitating the imaging of books;

positioning the dual-sided mirror of the device for facilitating the imaging of books at least substantially parallel with the second transparent plate;

imaging, using the first imaging device, the third page of the book, wherein the image is transmitted from the third page, through the first transparent plate, and reflected by the dual-sided mirror to the first imaging device;

positioning the dual-sided mirror of the device for facilitating the image of the books at least substantially parallel with the first transparent plate; and imaging, using the second imaging device, the second page of the book, wherein the image is transmitted from the fourth page, through the second transparent plate, and reflected by the dual-sided mirror to the second imaging device.

13. The method for imaging pages of a book of claim 6, wherein inserting, between the first page of the book and the second page of the book, the device for facilitating the imaging of books, decreases a first curvature of the first page and decreases a second curvature of the second page.

14. An apparatus for facilitating the imaging of books, the apparatus comprising:

a first plate, wherein the first plate is at least substantially transparent;

a second plate coupled approximately at a 45 degree angle with the first plate, wherein the second plate is at least substantially transparent;

a dual-sided mirror configured to be positioned substantially parallel with the first plate and to be positioned substantially parallel with the second plate, wherein:

the dual-sided mirror has at least two reflective sides, a first side of the dual-sided mirror is configured to reflect a first image of a first page of a book, the first image being received by the dual-sided mirror through the first plate;

a second side of the dual-sided mirror is configured to reflect a second image of a second page of the book, the second image being received by the dual-sided mirror through the second plate;

a first lateral support configured to couple the first plate with the second plate at substantially the 45 degree angle; and a second lateral support configured to couple the first plate with the second plate at substantially the 45 degree angle.

15. The apparatus for facilitating the imaging of books of claim 14, further comprising a hinge, wherein:

the hinge is located substantially at the origin of the angle formed by the first plate and the second plate; and the hinge is configured to allow the dual-sided mirror to pivot between being substantially parallel with the first plate and being substantially parallel with the second plate.

16. The apparatus for facilitating the imaging of books of claim 14, wherein: a first portion of the first plate and a second portion of the second plate, positioned at the substantially 45 degree angle from the first portion of the first plate, are configured to be inserted between the first page of the book and the second page of the book to increase a distance between the first page of the book and the second page of the book.

* * * * *